United States Patent
Wilhelmus et al.

(10) Patent No.: US 6,949,608 B2
(45) Date of Patent: Sep. 27, 2005

(54) PROCESS FOR PRODUCING HYDROGENATED POLYMERS

(75) Inventors: Johannes Wilhelmus, Geleen (NL); Charles D. Leonard, Baton Rouge, LA (US)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/488,968

(22) PCT Filed: Sep. 6, 2002

(86) PCT No.: PCT/NL02/00580

§ 371 (c)(1),
(2), (4) Date: Dec. 15, 2004

(87) PCT Pub. No.: WO03/022893

PCT Pub. Date: Mar. 20, 2003

(65) Prior Publication Data

US 2005/0131206 A1    Jun. 16, 2005

Related U.S. Application Data

(60) Provisional application No. 60/317,979, filed on Sep. 10, 2001.

(51) Int. Cl.$^7$ ............................................. C08C 19/02
(52) U.S. Cl. ...................... 525/338; 525/376; 525/374; 525/329.3; 525/383; 525/387; 528/482; 528/490; 528/492
(58) Field of Search ................................ 525/338, 376, 525/374, 383, 387, 329.3; 528/482, 490, 528/492

(56) References Cited

U.S. PATENT DOCUMENTS

| 3,631,163 | A |   | 12/1971 | Witt |
|---|---|---|---|---|
| 4,214,111 | A |   | 7/1980 | Kitamura et al. |
| 5,039,737 | A | * | 8/1991 | Parker et al. ............... 524/804 |
| 5,302,696 | A | * | 4/1994 | Schiessl ...................... 528/487 |
| 5,442,009 | A |   | 8/1995 | Parker et al. |
| 6,635,718 | B2 | * | 10/2003 | Belt et al. ................ 525/329.3 |

FOREIGN PATENT DOCUMENTS

| EP | 0 589 041 | 9/1996 |
|---|---|---|
| LU | 87692 | 7/1990 |
| NL | 1012554 | 7/1999 |
| WO | 91/06579 | 5/1991 |

* cited by examiner

*Primary Examiner*—Roberto Rabago
(74) *Attorney, Agent, or Firm*—Mayer Brown Rowe & Maw LLP

(57) ABSTRACT

The present invention relates to a process for the hydrogenation of an unsaturated polymer comprising hydrogenation of an unsaturated polymer in a reaction mixture comprising hydrazine, an oxidizing agent and a catalyst and the reduction or elimination of residual free hydrazine from the hydrogenated polymer, whereby the residual free hydrazine is reduced or eliminated from the reaction mixture by contacting it with an adsorbent and/or absorbent which is a solid material which has the ability to absorb and/or absorb hydrazine. The absorbent and/or absorbent is chosen from activated carbon, carbon black, silicates, chalk, talcum or transition metal containing solids.

11 Claims, No Drawings

PROCESS FOR PRODUCING HYDROGENATED POLYMERS

CROSS REFERENCE TO RELATED APPLICATION

This application is the National Phase of International Application PCT/NL02/00580 filed Sep. 6, 2002 which designated the U.S., and that International Application was published under PCT Article 21(2) in English.

The present invention relates to a process for the hydrogenation of an unsaturated polymer comprising hydrogenation of an unsaturated polymer in a reaction mixture comprising hydrazine, an oxidizing agent and a catalyst and the reduction or elimination of residual free hydrazine from the hydrogenated polymer.

Various forms of hydrogenated polymers have been introduced into the marketplace. Examples are the hydrogenated nitrile rubbers which have the advantage of being resistant to oxidative degradation at high temperatures, as well as being resistant to corrosive environments. These hydrogenated nitrile rubbers have found utility in the manufacture of belts, seals, gaskets and hoses.

A process for the hydrogenation of a nitrile rubber and for minimizing residual free hydrazine is described in U.S. Pat. No. 5,302,696. The polymer, in latex form, is first hydrogenated with hydrazine and peroxide in the presence of a metal-ion initiator, whereafter the residual free hydrazine is contacted with a hydrazine scavenger selected from isocyanates, alkylene oxides, acrylates, methacrylates, ketones, aldehydes, acrylonitrile and combinations thereof. A disadvantage in this process is that toxic and/or expensive organic reagents have to be used to reduce the residual free hydrazine. These organic reagents and their reaction products with hydrazine remain in the polymer and/or waterphase as contamination.

For most applications it is preferred that the amount of hydrazine is reduced or eliminated from the hydrogenated polymer. Reduction or elimination of the residual free hydrazine from the hydrogenated polymer provides a mixture having reduced toxicity.

The object of the present invention is to provide an alternative process for the production of hydrogenated polymers containing non or reduced amounts of hydrazine by the reduction or elimination of residual free hydrazine without the use of toxic or expensive organic reagents. A further object of the process of the present invention is to provide a more ecological sound process. Yet another object of the present invention is to provide a more economical and faster process.

Surprisingly these objects are achieved if the residual free hydrazine is reduced or eliminated from the reaction mixture by contacting it with an adsorbent and/or absorbent which is a solid material that has the ability to adsorb and/or absorb the hydrazine. A further advantage is that the process is faster and more economical because less hydrogen peroxide as oxidising agent is needed for residual hydrazine removal which results in shorter batch times. Another advantage is that if hydrogen peroxide is used as oxidising agent also residual hydrogen peroxide can be completely or significantly reduced by the use of said particulate solid adsorbent and/or absorbent.

Examples of adsorbents and/or absorbents according to the present invention are carbon black, silicate, chalk or talcum as for example described in Hofmann, Rubber Technology Handbook, Hanser Publishers, Munich Vienna N.Y., 1996, chapter 4.4.3, page 282–291. Examples of carbon black are for example described on page 285 in table 4.2 of said handbook. Other examples of usefull adsorbents and/or absorbents are activated carbon and typically all the commercially available activated carbon grades can be applied in the process of the present invention. Also usefull are in water insoluble metal hydroxides or metal oxide containing compounds, for example $TiO_2$, $ZrO_2$ or $Al(OH)_3$. Also mixtures of the above described adsorbents and/or absorbents may be used. Preferably activated carbon or carbon black is used in the process of the present invention. More preferably carbon black is used.

The activity of the adsorbents and/or absorbents may be further increased by contacting the adsorbent and/or absorbent with a transition metal compound to form a transition metal containing solid before contacting it with the hydrogenated polymer. Examples of the transition metal compounds are $TiCl_4$, $CuCl_2$, $CuSO_4$, $FeSO_4$, $FeCl_3$ or $VCl_4$. In this way the residual free hydrazine content may be reduced faster.

By the use of the adsorbent and/or absorbent, the residual free hydrazine may be reduced to less than 10 ppm. Preferably the residual free hydrazine may be reduced to less than 5 ppm. More preferably to less than 1 ppm.

According to the process of the present invention it is preferred that the adsorbent and/or absorbent is in contact with the reaction mixture after hydrogenation and before separation of the hydrogenated polymer from the reaction mixture.

The reaction mixture comprising the hydrogenated polymer may be contacted with the adsorbents and/or absorbents in different ways. The adsorbent and/or absorbent may be added to the reaction mixture or the reaction mixture may be passed through a fixed bed containing said adsorbent and/or absorbent. An example of a fixed bed is a column packed with activated carbon as applied in water cleaning operations.

In the case that the adsorbent and/or absorbent is added to the reaction mixture comprising the hydrogenated polymer, for example from 0,0001–10 parts by weight of the adsorbent and/or absorbent on 100 parts by weight hydrogenated polymer, may be used. Preferably from 0,001–1 parts by weight, on 100 parts weight hydrogenated polymer, is used. More preferably from 0,01–0,1 parts by weight, based on the 100 parts by weight hydrogenated polymer, is used. The adsorbent and/or absorbent may be present in the mixture during 0,01–10 hours, preferably during 0,1–1 hour. After adsorbing and/or absorbing the residual free hydrazine the adsorbent and/or absorbent may be separated from the reaction mixture by known means for example by filtration or centrifugation.

In a preferred embodiment the adsorbent and/or absorbent is not separated from the hydrogenated polymer but further mixed with the hydrogenated polymer during the work-up procedure for example as reinforcing filler. In that case additional adsorbent and/or absorbent may be added to the hydrogenated polymer. For example from 10–100 parts by weight of the adsorbent and/or absorbent may be added additionally on 100 parts by weight hydrogenated polymer. In this way the reduction of free residual hydrazine may be combined with the production of masterbatches. Preferably carbon black is used as adsorbent and/or absorbent so that carbon black masterbatches are produced.

Preferably the unsaturated polymer used in the process of the present invention is in the form of a latex. After the hydrogenation reaction the hydrogenated polymer can be separated from the latex. Examples of suitable separation processes are coagulation or steam stripping. Particularly coagulation is a suitable method, for which standard processes can be used, for instance the addition of an acid or salt to the aqueous dispersion of the polymer, Use can for example be made of a magnesium sulphate-, a calcium chloride—or an aluminium sulphate solution in water.

The unsaturated polymers useful in the process of the present invention for example comprise from 5–100% by weight of a conjugated diene monomer unit and from 95–0% by weight of an ethylenically unsaturated monomer unit. Examples of conjugated diene monomer units are 1,3-butadiene, 2,3-dimethylbutadiene, isoprene and 1,3-pentadiene. Preferably 1,3-butadiene is used. Examples of the ethylenically unsaturated monomer units include unsaturated nitriles for example acrylonitrile and methacrylonitrile, monovinyl aromatic hydrocarbons for example styrene, (o-, m- and p-) alkylstyrenes, divinyl aromatic hydrocarbons for example divinylbenzene, dialkenyl aromatics for example diisopropenylbenzene, unsaturated carboxylic acids and esters thereof for example acrylic acid, methacrylic acid, crotonic acid, itaconic acid, maleic acid, methyl acrylate, ethyl acrylate, butyl acrylate, 2-ethylhexyl acrylate and methyl methacrylate. Preferably as ethylenically unsaturated monomer unsaturated nitriles are used, more preferably acrylonitrile is used.

Examples of suitable unsaturated polymers useful in the process of the present invention are polybutadiene, polyisoprene, styrene-butadiene rubber (SBR), acrylonitrile-butadiene rubber (NBR), natural rubber, butadiene-isoprene rubber and terpolymers of butadiene, acrylonitrile and butylacrylate or acrylic acid.

Preferably, the unsaturated polymer, used in the process according to the present invention comprises from 50–80% by weight of the conjugated diene-monomer unit and from 20–50% by weight of the unsaturated nitrile group-containing monomer unit, more preferably, from 60–70% by weight of the conjugated diene-monomer unit and from 30–40% by weight of the unsaturated nitrile group-containing monomer unit. Preferably an acrylonitrile-butadiene (NBR) copolymer is used in the process of the present invention.

The unsaturated polymer may be one prepared by any method of preparation for example emulsion polymerisation, solution polymerisation or bulk polymerisation. It is preferred that the unsaturated polymer be prepared in an aqueous emulsion polymerisation process, because this yields the polymer directly in the form of a latex. The latex form of the unsaturated polymer may be hydrogenated as such. The polymer content of the latex may range from 1 to 70 wt. %, preferably from 5 and 40 wt. %.

A description of a hydrogenation process of unsaturated polymers in latex form is given in U.S. Pat. No. 5,442,009.

The hydrazine used in the process of the present invention may be added as such, but it is also possible to use a hydrazine-releasing compound for example hydrazine hydrate, hydrazine acetate, hydrazine sulphate or hydrazine hydrochloride. Preferably use is made of hydrazine or hydrazine hydrate. The hydrazine is for example present in a molar ratio between 0.1:1 to 100:1 relative to the double bonds in the polymer chain. Preferably, this ratio lies between 0.8:1 and 5:1, most preferably between 0.9:1 and 2:1.

Examples of oxidizing agents which are suitable in the process of the present invention are air, oxygen, ozone, peroxides, hydrogen peroxide, iodine, iodates, hypochlorite and similar compounds. Particulary suitable oxidizing agents are chosen from the group comprising peroxides and hydrogen peroxide. Most preferably, use is made of hydrogen peroxide. The oxidizing agent is for example present at a molar ratio of between 0.1:1 and 100:1 relative to the carbon—carbon double bonds. This ratio preferably is between 0.8:1 and 5:1, more preferably between 0.9:1 and 2:1.

The hydrogenation process is carried out in the presence of a catalyst. Suitable catalysts are compounds which contain an element from group 13, of the Periodic Table of the Elements as published on the inside of the cover of the Handbook of Chemistry and Physics, 67th edition, 1986–1987 in accordance with the latest IUPAC nomenclature, which elements are described in WO-A-0009576. Even more preferably, the catalyst is chosen from the group comprising borates, peroxyborates and boric acid ($H_3BO_3$). Most preferably, boric acid is used.

The man skilled in the art can easily determine how much of the above catalysts in molar ratio with respect to the hydrazine level, has to be used in the process of the present invention.

The sequence of addition of the hydrazine, oxidizing agent and the catalyst for the hydrogenation reaction can in principle be chosen freely. Preferably, however, the oxidizing agent is added to the reaction mixture after the hydrazine, in such a way that the concentration of the oxidizing agent remains low when the hydrogenation reaction takes place. Most preferably hydrazine and hydrogen peroxide are added simultaneously to the latex during hydrogenation.

The hydrogenation reaction can be carried out batchwise as well as continuously. Closed or open vessels may be used.

The hydrogenation degree is equal to $(A/B) \times 100\%$, where A is the amount of double bonds that has been saturated as a result of the hydrogenation reaction and B is the original amount of double bonds. The process according to the present invention yields polymers which have a hydrogenation degree of for example more than 60%. The hydrogenation degree is preferably higher than 80%. The process is eminently suitable for the preparation of polymers having a hydrogenation degree of more than 80%.

The hydrogenation reaction temperature may be between 0° C.–250° C.; preferably between 20° C.–150° C.; more preferably between 30° C.–80° C.

The hydrogenation time varies for example from 1 minute to 24 hours. The hydrogenation time varies preferably from 1–12 hour(s).

The hydrogenated polymer according to the present invention may contain additives, such as for instance stabilizers, chosen from the group comprising free radical stabilizers, phenolic antioxidants, amine antioxidants, dihydroquinoline derivatives, benzimidazole derivatives and naphthylamine derivatives. The hydrogenated polymer may for instance also contain reinforcing fibres or a second polymer.

The hydrogenated polymer according to the present invention may for example be injection moulded to form moulded articles. Examples of moulded articles, in which the hydrogenated polymer shows up very well are automotive parts to be mounted in the engine compartment.

The process according to the present invention will be elaborated in the following examples, without however being restricted thereto.

Experiment A

A hydrogenated NBR latex was prepared according to a similar procedure as described in example A of NL-A-1012554. A sample of the latex was precipitated with a saturated solution of calcium chloride in water under vigorous stirring. The hydrazine content of the latex serum was determined with the aquamerck hydrazine test. The hydrazine content was 40 ppm.

After heating for 1 hour at 50° C. and similar precipitation procedure the latex serum contained 40 ppm hydrazine.

After heating for 2 hours at 50° C. and similar precipitation procedure the latex serum contained 40 ppm hydrazine.

EXAMPLE I 100 gram of the latex prepared in experiment A was mixed with 0,1 g CA-1® activated carbon supplied by Norit and stirred at 50° C. for an hour. After 1 hour the hydrogenated polymer was percipitated in a similar way as in experiment A. The hydrazine level had been reduced to 3 ppm.

EXAMPLE II

Example I was repeated, the difference being that before coagulation, the hydrogenated polymer was mixed with 0,1g SA Super activated carbon supplied by Norit per 100 g latex. After precipitation in a similar way as in experiment A, the hydrazine level had been reduced to 3 ppm.

EXAMPLE III

Example I was repeated, the difference being that the hydrogenated polymer was mixed with 0,01 g CA-1® activated carbon supplied by Norit. After 2 hours the hydrogenated polymer was precipitated in a similar way as in experiment A. The hydrazine level had been reduced to 6 ppm.

EXAMPLE IV

Example I was repeated, the difference being that the hydrogenated polymer was mixed with 0,01 g SA Super activated carbon supplied by Norit. After 2 hours the hydrogenated polymer was precipitated in a similar way as in experiment A. The hydrazine level had been reduced to 7 ppm.

EXAMPLE V

Example I was repeated, the difference being that the hydrogenated polymer was mixed with 1g SRF 772® carbon black. After 1 hour the hydrogenated polymer was percipitated in a similar way as in experiment A. The hydrazine level had been reduced to 5 ppm.

As can be seen from the above examples the level hydrazine may be reduced significantly in a relative short time by using activated carbon or carbon black.

What is claimed is:

1. Process for the hydrogenation of an unsaturated polymer comprising hydrogenation of an unsaturated polymer in a reaction mixture comprising hydrazine, an oxidizing agent and a catalyst and the reduction or elimination of residual free hydrazine from the hydrogenated polymer characterized in that the residual free hydrazine is reduced or eliminated from the reaction mixture by contacting it with an adsorbent and/or absorbent which is a solid material that has the ability to adsorb and/or absorb the hydrazine.

2. Process according to claim 1, wherein the adsorbent or absorbent is chosen from activated carbon, carbon black, silicates, chalk, talcum or transition metal containing solids.

3. Process according to claim 1, wherein the adsorbent and/or absorbent is activated carbon or carbon black.

4. Process according to claim 1, wherein the adsorbent and/or absorbent is in contact with the reaction mixture after hydrogenation and before separation of the hydrogenated polymer from the reaction mixture.

5. Process according to claim 1, wherein the adsorbent and/or absorbent is added to the reaction mixture.

6. Process according to claim 1, wherein from 0,0001–10% parts by weight adsorbent and/or absorbent is added based on 100 parts by weight hydrogenated polymer.

7. Process according to claim 5, wherein the adsorbent and/or absorbent is not separated from the hydrogenated polymer but further mixed with the hydrogenated polymer.

8. Process according to claim 7, wherein from 10–100 parts by weight additional adsorbent and/or absorbent is used based 100 parts by weight hydrogenated polymer.

9. Process according to claim 1, wherein the hydrogenated polymer is in a latex form.

10. Process according to claim 1, wherein the unsaturated polymer is acrylonitrile-butadiene rubber (NBR).

11. Process according to claim 1, wherein the hydrogenation is carried out in the presence of a catalyst which contains an element from group 13 of the periodic system.

* * * * *

UNITED STATES PATENT AND TRADEMARK OFFICE
CERTIFICATE OF CORRECTION

PATENT NO. : 6,949,608 B2  Page 1 of 1
DATED : September 27, 2005
INVENTOR(S) : Johannes Wilhelmus Belt et al.

It is certified that error appears in the above-identified patent and that said Letters Patent is hereby corrected as shown below:

<u>Title page,</u>
Item [75], Inventor, "Johannes Wilhelmus" should read -- Johannes Wilhelmus Belt --.

Signed and Sealed this

Twenty-ninth Day of November, 2005

JON W. DUDAS
*Director of the United States Patent and Trademark Office*